(12) United States Patent
Twell

(10) Patent No.: US 9,567,914 B2
(45) Date of Patent: Feb. 14, 2017

(54) EASILY ADAPTABLE COMPRESSOR BLEED SYSTEM DOWNSTREAM OF A VANE PLATFORM

(75) Inventor: Philip Twell, Welton (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 591 days.

(21) Appl. No.: 14/117,746

(22) PCT Filed: Apr. 27, 2012

(86) PCT No.: PCT/EP2012/057839
§ 371 (c)(1),
(2), (4) Date: Nov. 14, 2013

(87) PCT Pub. No.: WO2012/163612
PCT Pub. Date: Dec. 6, 2012

(65) Prior Publication Data
US 2014/0075955 A1 Mar. 20, 2014

(30) Foreign Application Priority Data
May 30, 2011 (EP) .................................... 11168121

(51) Int. Cl.
*F02C 9/18* (2006.01)
*F02C 6/08* (2006.01)
(Continued)

(52) U.S. Cl.
CPC . *F02C 9/18* (2013.01); *F01D 9/06* (2013.01); *F01D 11/005* (2013.01); *F02C 6/08* (2013.01); *F04D 29/522* (2013.01); *F04D 29/526* (2013.01)

(58) Field of Classification Search
CPC ................ F02C 9/18; F02C 6/08; F01D 9/06;
F01D 11/005; F01D 9/065; F01D 11/02;
F01D 11/025; F01D 11/04; F01D 11/08;
F01D 11/10; F04D 29/522; F04D 29/526
(Continued)

(56) References Cited

U.S. PATENT DOCUMENTS

| 4,155,680 A | 5/1979 | Linko, III |
| 5,158,430 A * | 10/1992 | Dixon ................... F01D 11/005 415/134 |

(Continued)

FOREIGN PATENT DOCUMENTS

| EP | 1136679 A2 | 9/2001 |
| EP | 1609999 A2 | 12/2005 |

(Continued)

*Primary Examiner* — William H Rodriguez
*Assistant Examiner* — Filippo Manfredi
(74) *Attorney, Agent, or Firm* — Beusse Wolter Sanks & Maire

(57) ABSTRACT

Discrete bleed behind stator vane platform is provided. The discrete bleed behind stator vane platform relates to a system for bleeding off a working fluid from an inner volume (Vi) of a turbo-machine. The system includes a vane carrier with an annular rail and a vane device comprising at least one vane element, a vane platform and a vane root. The vane element is mounted to the vane platform and the vane root is mounted to the annular rail. A first annular cavity is formed between the vane platform and the annular rail, wherein an annular gap is formed between an edge of the vane platform and the vane carrier such that a part of the working fluid of the turbo-machine is bleedable through the annular gap into the first annular cavity. A second annular cavity is formed between the vane root, the annular rail and the vane carrier, wherein at least one inlet hole is formed into the annular rail for coupling the first annular cavity and the second annular cavity.

14 Claims, 2 Drawing Sheets

(51) Int. Cl.
 *F01D 9/06* (2006.01)
 *F01D 11/00* (2006.01)
 *F04D 29/52* (2006.01)

(58) Field of Classification Search
 USPC ......................................................... 415/144
 See application file for complete search history.

(56) References Cited

U.S. PATENT DOCUMENTS

| | | | |
|---|---|---|---|
| 6,325,595 | B1 | 12/2001 | Szucs |
| 6,986,638 | B2 | 1/2006 | Cumpsty |
| 7,090,462 | B2 | 8/2006 | Crum |
| 7,967,556 | B2 * | 6/2011 | Gummer ............ F04D 27/0215 |
| | | | 415/144 |
| 2006/0039782 | A1 | 2/2006 | Crum |
| 2008/0310950 | A1 * | 12/2008 | Young .................... F01D 5/082 |
| | | | 415/116 |
| 2010/0232935 | A1 * | 9/2010 | Twell ................... F01D 17/162 |
| | | | 415/151 |

FOREIGN PATENT DOCUMENTS

| | | | |
|---|---|---|---|
| GB | 2388875 | A | 11/2003 |
| JP | 2002195196 | A | 7/2002 |
| RU | 2036333 | C1 | 5/1995 |
| RU | 2136973 | C1 | 9/1999 |
| RU | 2302558 | C1 | 7/2007 |

* cited by examiner

EASILY ADAPTABLE COMPRESSOR BLEED SYSTEM DOWNSTREAM OF A VANE PLATFORM

CROSS REFERENCE TO RELATED APPLICATIONS

This application is the US National Stage of International Application No. PCT/EP2012/057839 filed Apr. 27, 2012, and claims the benefit thereof. The International Application claims the benefit of European Application No. EP 11168121 filed May 30, 2011. All of the applications are incorporated by reference herein in their entirety.

FIELD OF INVENTION

The present invention relates to a system for bleeding off a working fluid from an inner volume of a turbo-machine. Furthermore, the present invention relates to a turbo-machine. Furthermore, the present invention relates to a method for bleeding off a working fluid from an inner volume of a turbo-machine.

BACKGROUND

In turbo-machines, such as in axial compressors, a working fluid flows through an inner volume. A part of the working fluid is bled off from the inner volume and is usually used for compressor management and for cooling or seal buffering purposes, e. g. in bearing areas. The bled off fluid may also be used to cool components in the turbine section of a gas turbine.

U.S. Pat. No. 4,155,680 discloses a compressor protection means. A compressor comprises a casing with a passage adapted to pass bleed air to a circumferentially extending bleed manifold surrounding the casing. Through apertures on a split line of adjacent vane platforms air is extracted into the circumferentially extending bleed manifold.

JP 2002 195196 A discloses a bleed structure of an axial compressor, wherein a casing of the compressor comprises the plurality of bleed holes for bleeding off an inner volume of the compressor.

U.S. Pat. No. 7,000,462 B discloses a compressor bleed air manifold for a blade clearance control. A compressor bleed air manifold includes annular outer flanges on opposite sides of a generally annular manifold plenum. Between two casing sections air from the compressor is bled off through a duct into the annular manifold plenum.

In many conventional systems for bleeding off air from an inner volume of a compressor, the air is injected directly into an annular main bleed chamber. Moreover, the channel between the main bleed chamber and the inner volume has to be casted into a vane carrier or a housing of the compressor. Alternatively, in a vane platform of a stator vane, holes are drilled for generating a fluid connection between the inner volume and the main bleed chamber.

EP 1 609 999 discloses a turbo-machine, wherein between a stator vane and a rotor blade air injection nozzles are formed at a stator housing. Air flows from an air chamber through the injection nozzle inside an inner volume of the turbo-machine.

SUMMARY OF THE INVENTION

It may be an objective of the present invention to provide an efficient bleeding off of working fluid of a turbo-machine without needing complex structural components.

This object is solved by a system for bleeding off a working fluid from an inner volume of a turbo-machine, by a turbo-machine and by a method for bleeding off a working fluid from an inner volume of a turbo-machine according to the independent claims.

According to a first aspect of the present invention, a system for bleeding off a working fluid from an inner volume of a turbo-machine is presented. The system comprises a vane carrier comprising an annular rail and a vane device comprising at least one vane element, at least one vane platform and a vane root. The vane element is mounted to the vane platform for mounting the vane device to the vane carrier. The vane root is mounted to the annular rail. A first annular cavity is formed between the vane platform and the annular rail. An annular gap is formed between an edge of the vane platform and the vane carrier such that a part of the working fluid of the turbo-machine is bleedable through the annular gap into the first annular cavity. A second annular cavity is formed between the vane root, the annular rail and the vane carrier. At least one inlet hole is formed into the annular rail for coupling the first annular cavity and the second annular cavity.

According to a further aspect of the present invention a turbo-machine is provided. The turbo-machine comprises a rotatable shaft being rotatable around a rotary axis. A radial direction is orientated perpendicular to the rotary axis. Furthermore, the turbo-machine comprises at least one system as described above. A vane platform of the vane device surrounds partially the inner volume of the turbo-machine, wherein inside the inner volume the working fluid is flowable. The at least one vane element extends from the vane platform into the inner volume such that the working fluid is flowable along the vane element.

According to a further aspect, a method of bleeding off a working fluid from an inner volume of a turbo-machine with the above-described system is presented.

The turbo-machine describes a turbo-machinery that transfers energy between a rotor and the working fluid streaming through the inner volume of the turbo-machine. The turbo-machine may describe a turbine or a compressor. While a turbine transfers energy from a fluid to a rotor, a compressor transfers energy from a rotor to a fluid.

Moreover, the turbo-machine comprises the rotatable shaft. The rotatable shaft is rotatable around the rotary axis, wherein a direction along the rotary axis defines the axial direction of the turbo-machine and a direction perpendicular to the rotary axis which runs through the center of the shaft defines the "radial" direction of the turbo-machine. The term "annular" in this application defines a run of a respective element along a circumferential direction around the rotatable shaft. The system and in particular the vane carrier and the vane device extend along the circumferential direction around the shaft such that parts of the vane carrier and the vane device, such as the rail and the vane platform may have an annular run and an annular shape. For example, the vane carrier may form a closed ring around the shaft or may only run partially around the annular shape and forms, for example, a half or quarter ring.

The turbo-machine comprises for example a casing or a carrying structure, to which a vane carrier is mountable. The casing of the turbo-machine may have an annular shape and extend along a circumferential direction fully or partially around the rotary axis.

Between the casing, the vane carrier and the vane platform on the one side and the shaft on the other side, the inner volume of the turbo-machine is defined.

The vane device comprises at least one vane element, at least one vane platform and the vane root. The vane element extends from the vane platform inside the inner volume.

In a further exemplary embodiment, the system comprises a further vane platform. The vane element is mounted between the vane platform and the further vane platform.

In a further exemplary embodiment, the system comprises a further vane carrier, wherein the further vane carrier is mounted radially inwards to the further vane platform.

The vane device comprises the further, e.g. radially inwards located, vane platform (e.g. inner shroud) to which the further vane carrier is mountable. The vane element is mounted between the vane platform (e.g. outer shroud) and the further vane platform (e.g. inner shroud).

In a further exemplary embodiment, from a radial outer position of the vane element, the vane element starts from the radial outward located vane platform (outer shroud) and runs along the radial direction to the radially inwards located further platform (inner shroud). The inwards located further vane carrier may support adjacent vane devices with adjacent further inner platforms to form a segmented ring around the (e.g. compressor) rotatable shaft. Respectively, the outwards located vane carrier may support adjacent vane devices with adjacent outer platforms to form a segmented ring around the (e.g. compressor) rotatable shaft.

According to a further exemplary embodiment the further vane platform or the further vane carrier comprises a sealing arrangement which is abuttable to the rotatable shaft for sealing purposes.

The vane carrier may be located radially outwards in comparison to the radially inwards located further vane carrier.

Hence, from a radial outer position of the vane element, the vane element starts from the radial outward located vane carrier and runs along the radial direction to the radially inwards located further vane carrier.

The vane carrier and/or the further vane carrier may comprise an annular shape along the circumferential direction. The vane carrier is mountable to the casing of the turbo-machine. The vane devices are mounted and fixed to the vane carrier. In particular, the vane carrier and/or the further vane carrier comprises, e.g. along the inner surface which faces the inner volume, a groove, wherein the annular rail and a further radially inwards located rail extends circumferentially inside the respective groove. The vane device may be fixed with its vane root to the annular rail inside the groove of the vane carrier and/or the further vane carrier by engaging the annular rail such that a fitting of the vane device to the vane carrier is achieved. The vane carrier may also form an integral part of the casing.

The vane root and/or a, in comparison to the vane root, radially inwards located vane root of the vane element is adapted for being fixed to the vane carrier and/or the further vane carrier, respectively, e.g. by any suitable fixation means. In particular, the vane root and/or the radially inwards located vane root is fixable to the vane carrier and to the further vane carrier, respectively, by a dovetail connection, for example.

The vane platform separates the vane root and/or the radially inwards located vane root from the vane element. The vane platform (outer shroud) and/or the radially inwards located vane platform (inner shroud) comprises a platform surface which faces the inner volume and the working fluid streaming inside the inner volume streams along the inner platform surface and the radially inwards located inner platform surface. The respective vane platforms are in particular mounted into the (further) vane carrier in such a way that along the axial direction the inner platform surface, the radially inwards located inner platform surface, the inner surface of the vane carrier and the further inner surface of the further vane carrier, which surfaces faces the inner volume, form a homogeneous cross over and do not form e.g. an offset or step along the radial direction between each other, for example.

The working fluid is for example a gas, such as air. Moreover, the working fluid may comprise exhaust gas from a burner chamber, for example.

The vane platform comprises the edge which faces the vane carrier, in particular in axial direction. Between the edge and the opposed edge of the vane carrier, the annular gap is formed. The working fluid is able to flow from the inner volume through the annular gap into the first annular cavity. The annular gap extends along a circumferential direction, for example. The edge of the vane platform runs along the circumferential direction and the opposed edge (with respect to the edge of the vane platform) of the vane carrier runs also along the same circumferential direction. Both edges, the edge of the vane platform and the opposed edge of the vane carrier may run in parallel along the circumferential direction. Hence, the annular gap comprises along the circumferential direction the same dimensions (i.e. a constant width) due to the parallel runs of the edge of the vane platform and the opposed edge of the of the vane carrier. Furthermore, the edge of the vane platform which forms the annular gap is the outermost downstream located edge or section of the vane platform, i.e. no further sections of the vane platform extend further downstream than the edge of the vane platform forming the annular gap.

Through the annular gap the working fluid streams into the first annular cavity. Between a radially outer platform surface of the vane platform, which faces the annular ring and which is located opposed to the inner platform surface, and the annular rail, the first annular cavity is formed. The working fluid which streams inside the first annular cavity flows circumferentially along the first annular cavity.

At predefined positions along the annular ring the at least one inlet hole is formed such that the working fluid is flowable from the first cavity to the second cavity. Because the inlet hole is formed inside the rail, no further provisions, such as further connecting holes, are necessary to be formed into the vane device.

The second annular cavity is formed between a surface of the vane root, the annular rail and inner surfaces of the vane carrier. In particular, the annular rail is formed in such a way that the annular rail separates the first annular cavity and the second annular cavity. By the present invention, the second annular cavity may be formed behind the radially outer surface of the (e.g. dovetail shaped) vane root of the vane device. From the second annular cavity the bled off working fluid may be forwarded, for example by a fluid outlet inside the vane carrier, to locations where the working fluid is required. The bled of working fluid may be used for cooling purposes or for compressor management tasks, for example. The second annular cavity is fed by the working fluid via the annular gap formed between an edge of the stator platform and the carrier ring.

In a further exemplary embodiment, a respective first cavity and a respective second cavity are formed between the radially inwards located platform, the radially inwards located further annular rail, the radially inwards located vane root and the further vane carrier, wherein the respective first cavity and the respective second cavity are connected by respective inlet holes. The respective first cavity and the respective second cavity may comprise similar geometric shapes and specifications as the above described first cavity and second cavity located between the vane platform, the annular rail, the vane root and the vane carrier.

By the above-described system according to the present invention, the working fluid is bled off at edges of the vane platform and not at special provisions, such as inlet holes in the vane platform, for example. Hence, only minimal changes to known stator vane geometry are needed. Beside the inlet holes in the rail, no further provisions, such as casted features to the vane carrier, are needed. Because the working fluid streams first of all inside the first annular cavity and from the first annular cavity finally to the second annular cavity, the working fluid, which is turbulent after injection inside the first cavity, may calm down such that after injection through the inlet hole into the second cavity, the bled off working fluid is less turbulent which has a positive effect for the further use.

Moreover, because no provisions for guiding the working fluid through the vane device have to be accomplished, the physical strength of the vane device is not reduced, for example by additionally inlet holes. Hence, by the present invention, an effective system for bleeding off working fluid is formed without the need of complex structural components.

According to a further exemplary embodiment, the vane element comprises a leading edge and a trailing edge. The working fluid is streamable from the leading edge to the trailing edge along the vane element. With respect to the vane element the edge of the vane platform is located downstream with respect to a flow path of the working fluid inside the inner volume.

By bleeding off the working fluid from the inner volume at a downstream location, in particular between the vane device and a further downstream located rotating blade device, the bleeding off of working fluid may be aerodynamically efficient. In particular, the bleeding off of working fluid between the vane device and the rotor blade device is more aerodynamically efficient than for example the bleeding off of working fluid upstream of the vane device or in a region between leading edge and trailing edge of respective vane devices or rotor blade devices.

According to a further exemplary embodiment, the vane root comprises an annular groove, wherein the annular rail is engaged into the annular groove for mounting the vane root to the annular rail. In particular, the annular groove in the vane root may form a dovetail shaped profile, such that a dovetail connection with the annular rail is formed.

According to a further exemplary embodiment, the vane device comprises a plurality of vane elements. In particular, along the annular, circumferential direction of the vane platform, the plurality of vane elements may be attached one after another along the circumferential direction.

According to a further exemplary embodiment, the system further comprises a further vane device comprising at least one further vane element, a further vane platform and a further vane root. The further vane element is mounted to the further vane platform. The further vane root is mounted to the annular rail. The first annular cavity is formed between the vane platform, the further vane platform and the rail. The annular gap is formed between a further edge of the further vane platform and the vane carrier such that a part of the working fluid is bleedable through the annular gap into the first annular cavity. The second annular cavity is formed between the vane root, the further vane root, the annular rail and the vane carrier.

By the above-described exemplary, along the circumferential direction around the shaft of the turbo-machine, a plurality of vane devices may be attached one after another along the circumferential direction to the vane carrier. Both edges of the vane devices, in particular both downstream located edges of the vane devices form the (same) annular gap such that the annular gap runs along circumferential direction and passes both vane devices. Furthermore, the first annular cavity and the second annular cavity is formed by the respective vane platforms and respective vane roots of the respective vane devices, such that the first annular cavity and the second annular cavity run along the circumferential direction and pass the vane devices. The first annular cavity and the second annular cavity form an annular shaped volume along which the bled off working fluid is flowable.

According to a further exemplary embodiment, the system further comprises a seal, wherein between the vane platform and the further vane platform a further gap is formed and wherein the seal abuts against the vane device and the further vane device such that a leakage of the working fluid between the second annular cavity and the further gap is at least partially prevented. Hence, an undesired leakage of the bled off air from the second annular cavity back into the inner volume is reduced such that the efficiency of the system is increased.

According to a further exemplary embodiment, the vane carrier comprises a fluid outlet for bleeding off the working fluid out of the second cavity into an outer volume of the carrier device. The outer volume defines the volume around the inner volume of the turbo-machinery. In the outer volume various equipments and pipes may be installed which may be fed by the bled off working fluid.

According to a further exemplary embodiment, the at least one inlet hole is formed into the annular rail such that the inlet hole extends along the radial direction.

By the present invention, bleeds, i.e. locations where working fluid is bled off from the inner volume, can be added without amending and stretching an existing gas passage. Any provisions to the vane device are not necessary. Moreover, a splitting of the casing or the carrier ring for bleeding off the working fluid from the most appropriate stage is not necessary.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
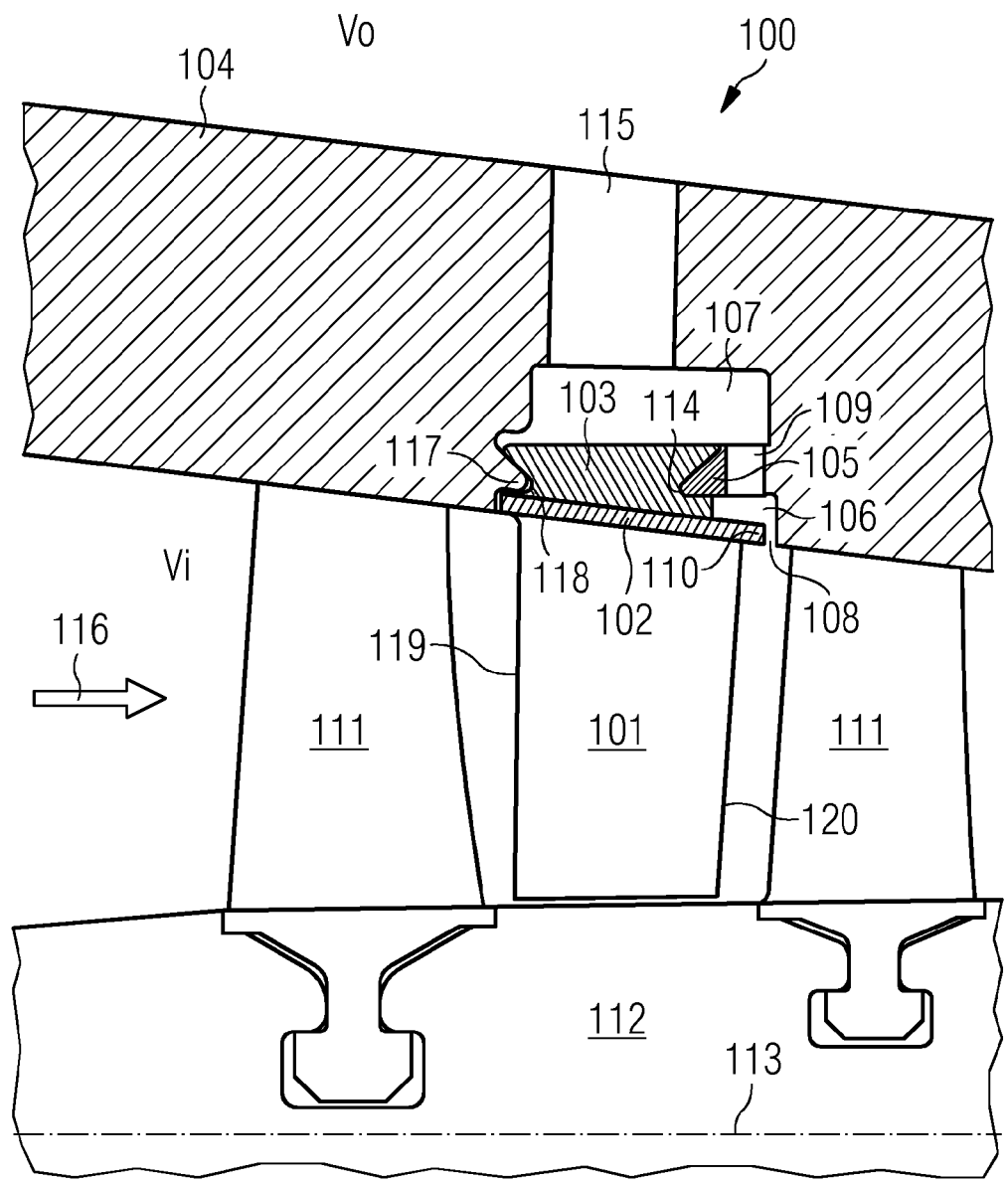
FIG. 1 shows a sectional view of a system for bleeding off working fluid according to an exemplary embodiment of the present invention.

The illustrations in the drawings are schematical. It is noted that in different figures, similar or identical elements are provided with the same reference signs.

Figure 2:
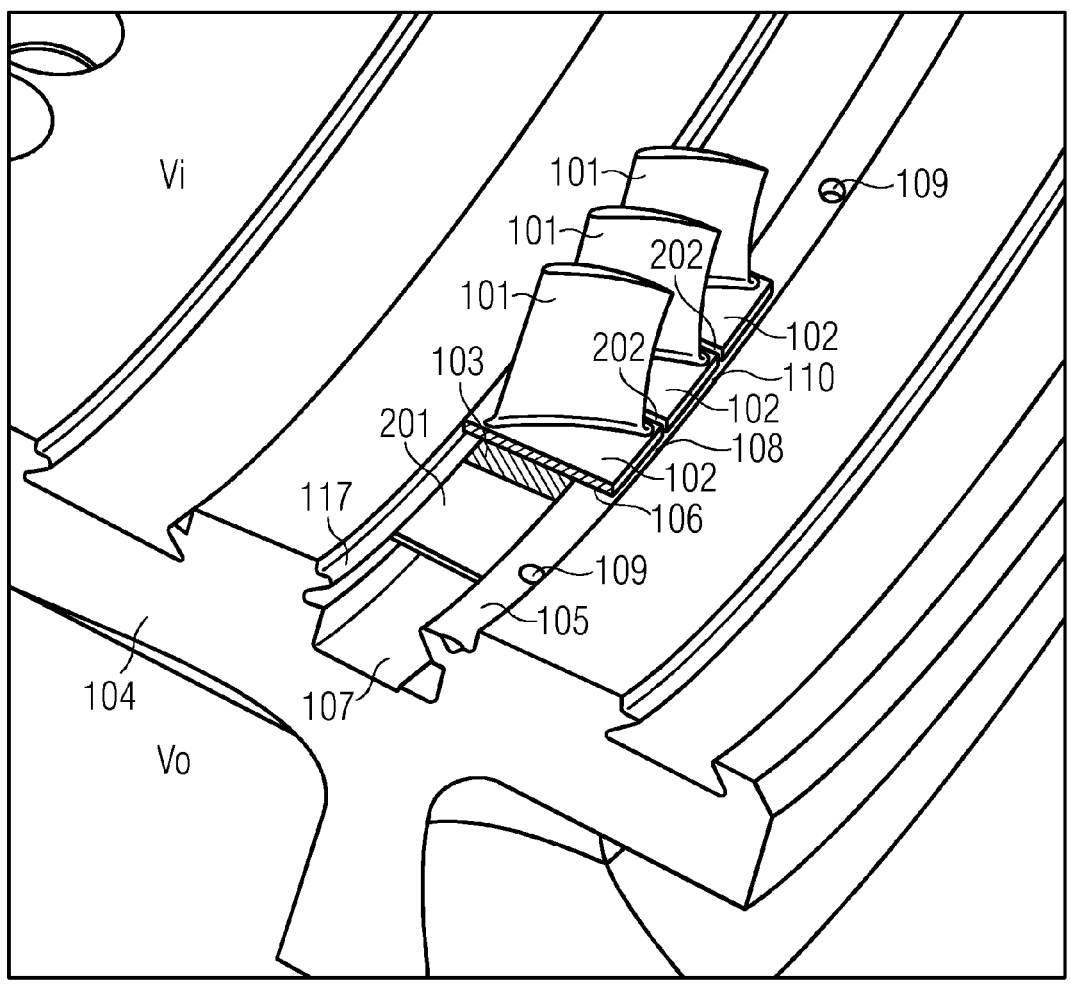
FIG. 2 shows a perspective view of a part of the system for bleeding off working fluid according to an exemplary embodiment of the present invention.

FIG. 1 and FIG. 2 illustrate a system 100—particularly a compressor section of a turbine, e.g. a gas turbine—for bleeding off a working fluid from an inner volume Vi of a turbo-machine.

The system 100 comprises a vane carrier 104 and a vane device. The vane carrier 104 comprises an annular rail 105. The vane device comprises at least one vane element 101, a vane platform 102 and a vane root 103. The vane element 101 is mounted to the vane platform 102. The vane root 103 is mounted to the annular rail 105.

The first annular cavity 106 is formed between the vane platform 102 and the annular rail 105. An annular gap 108 is formed between an edge 110 of the vane platform 102 and the vane carrier 104 such that a part of the working fluid of the turbo-machine is bleedable off through the annular gap 108 into the first annular cavity 106.

A second annular cavity 107 is formed between the vane root 103, the annular rail 105 and the vane carrier 104, wherein at least one inlet hole 109 is formed into the annular rail 105 for coupling the first annular cavity 106 and the second annular cavity 107.

The at least one inlet hole 109 may have a larger axial expanse than the annular gap 108.

Inside the inner volume Vi of the turbo-machine the working fluid flows along a flow path 116. Along the flow path 116 vane elements 101 (or groups of vanes) and blades 111 (or groups of blades) are mounted circumferentially one after another. The blades 111 are fixed to a shaft 112 which is rotatable around a rotary axis 113 (which is not indicated at the correct spot and may have a further distance to the blades 111, but at least the orientation of the rotary axis 113 is shown). The blades 111 are mounted along a circumferential direction one after another directly or indirectly to the shaft 112.

The vane element 101 is mounted to a vane platform 102 of the vane device or may be integral with the vane platform 102. The vane element 101 extends from the vane platform 102, i.e. a radially inner platform surface, inside the inner volume Vi. On the opposed side of the vane platform 102, i.e. a radially outer platform surface, the vane root 103 extends into the vane carrier 104. The vane carrier 104 may be attached to the casing of the turbo-machine or may be an integral part and integrally formed with the casing of the turbo-machine. Along the radially inner platform surface of the vane platform 102 the working fluid flows along inside the inner volume Vi.

The vane element 101 comprises a leading edge 119 at which the working fluid flows against the vane element 101. After flowing along the vane element 101 the working fluid leaves the vane at a trailing edge 120. Hence, the leading edge 119 is located upstream of the blade 101 and the trailing edge 120 is located downstream of the vane element 101 with respect to the flow of the working medium.

As can be taken from FIG. 1, the upstream edge of the vane platform 102 is in tight contact with the vane carrier 104, such that a bleeding off of the working fluid is prevented. At an edge 110 located downstream of the vane element 101 and the vane platform 102, respectively, the annular gap 108 is formed between the downstream edge 110 and the vane carrier 104. Through the annular gap 108 a part of the working fluid may be bled off into the first annular cavity 106. The first annular cavity 106 is formed by a space between the radially outer platform surface and the annular rail 105 of the vane carrier 104.

The annular rail 105 may be separately attached to the vane carrier 104 or may be integrally formed with the vane carrier 104. The annular rail 105 may run along the circumferential direction around the shaft 112. The annular rail 105 is formed in such a way that the annular rail 105 may be engaged by an annular groove 114 of the vane root 103. At an axially opposed end of the vane root 103, a further annular groove 118 is formed into the vane root 103. Additionally a corresponding further annular rail 117 is formed into the vane carrier 104. The further annular rail 117 is engaged by the further annular groove 118.

At least one inlet hole 109 is formed into the annular rail 105 such that the first annular cavity 106 and the second annular cavity 107 are connected. The bled off working fluid is flowable from the first annular cavity 106 into the second annular cavity 107.

The inlet hole 109 is in particular formed with a radial orientation along a radial direction. The radial direction is a direction which is substantially perpendicular to the rotary axis 113 and runs through the rotary axis 113. Alternatively the radial direction of the inlet hole 109 is inclined as to substantially coincide with the swirl direction i.e. tangential flow direction of the working fluid at the annular gap 108 where the working fluid is extracted. This is to further reduce any pressure losses on the fluids route from the point of extraction to its point of use.

The second annular cavity 107 is formed between a radial outer surface of the vane root 103 and the vane carrier 104. The bled off working fluid may flow through a fluid outlet 115 into the outer volume Vo which surrounds the vane carrier 104 for further use.

FIG. 2 illustrates a perspective view of the exemplary embodiment shown in FIG. 1. As can be taken from FIG. 2, the plurality, e.g. three, vane devices are mounted to the vane carrier 104 one after another along the circumferential direction. Adjacent rings of vanes are also not shown so that only grooves within the carrier 104 to insert the vanes of the adjacent rings of vanes are shown.

The vane devices are mounted with their respective vane roots 103 to the further annular rail 117 and the annular rail 105. Between the respective vane platforms 102 and the annular rail 105 the first cavity 106 is formed. The first cavity 106 has an annular run such that working fluid which is bled off may flow in circumferential direction along the annular first cavity and may pass a plurality of vane devices. Between the vane platforms 102 and the vane carrier 104 a small split, in particular the annular gap 108, is formed. Through the annular gap 108 the working fluid is bled off from the inner volume Vi into the first annular cavity 106.

The annular rail 105 comprises along its circumferential direction a plurality of inlet holes 109 which connects and couples the first annular cavity 106 with the second annular cavity 107. The second annular cavity 107 is formed below the plurality of vane roots 103 of the respective vane devices and the vane carrier 104.

The vane platforms 102 of the vane devices comprise further edges along the circumferential direction which face each other. Between the adjacent edges of the vane platforms 102 a further gap 202 may exist, through which the bled off working fluid may flow from the second annular cavity 107 back into the inner volume Vi. In order to reduce this leakage, a seal 201 may be installed. The seal 201 may have a plate-like shape and may form a strip. The seal 201 runs along the circumferential direction and may abut against the annular rails 117, 105 and the radially outer surfaces of the vane roots 103. The seal 201 runs along the circumferential direction and seals thereby the further gaps 202 between adjacent vane devices, such that a leakage of the working fluid is reduced.

The invention is particularly advantageous as bleed is discrete. Discrete bleeds can be added without stretching an existing gas passage or splitting an outer casing to allow service air to be taken from a most appropriate compressor stage.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A system for bleeding off a working fluid from an inner volume (Vi) of a turbo-machine, the system comprising
   a vane carrier comprising an annular rail, a vane device comprising at least one vane element, at least one vane platform and a vane root,
   wherein the vane element is mounted to the vane platform,
   wherein the vane root is mounted to the annular rail,
   wherein a first annular cavity is formed by a space between a radially outer surface of the vane platform and the annular rail,
   wherein an annular gap is formed between an edge of the vane platform and the vane carrier such that a part of the working fluid of the turbo-machine is bleedable through the annular gap into the first annular cavity,
   wherein a second annular cavity is formed between the vane root, the annular rail and the vane carrier radially outward of the vane root along a radial axis of the vane element, and
   wherein at least one inlet hole is formed into the annular rail without a further hole or other weakening provision being formed in the vane device for coupling the first annular cavity and the second annular cavity.

2. The system according to claim 1,
   wherein the vane element comprises a leading edge and a trailing edge,
   wherein the working fluid is streamable from the leading edge to the trailing edge along the vane element, and
   wherein with respect to the vane element, the edge of the vane platform is located downstream with respect to a flow path of the working fluid.

3. The system according to claim 1,
   wherein the vane root comprises an annular groove,
   wherein the annular rail is engaged into the annular groove for mounting the vane root to the annular rail.

4. The system according to claim 1, wherein the vane device comprises a plurality of vane elements.

5. The system according to claim 1, further comprising
   a further vane device comprising at least one further vane element, a further vane platform and a further vane root,
   wherein the further vane element is mounted to the further vane platform,
   wherein the further vane root is mounted to the annular rail,
   wherein the first annular cavity is formed between the vane platform, the further vane platform and the annular rail,
   wherein the annular gap is formed between a further edge of the further vane platform and the vane carrier such that a part of the working fluid is bleedable through the annular gap into the first annular cavity, and
   wherein the second annular cavity is formed between the vane root, the further vane root, the annular rail and the vane carrier.

6. The system according to claim 5, further comprising a seal,
   wherein between the vane platform and the further vane platform a further gap is formed, and
   wherein the seal abuts against the vane device and the further vane device such that a leakage of working fluid between the second annular cavity and the further gap is at least partially prevented.

7. The system according to claim 1,
   wherein the vane carrier comprises a fluid outlet for bleeding the working fluid out of the second cavity into an outer volume (Vo) of the carrier device.

8. The system according to claim 1 further comprising a radially inward further vane platform,
   wherein the vane element is mounted between the vane platform and the radially inward further vane platform.

9. The system according to claim 8, further comprising a radially inward further vane carrier,
   wherein the radially inward further vane carrier is mounted radially inwards to the radially inward further vane platform.

10. The system according to claim 8,
    wherein the radially inward further vane platform or the radially inward further vane carrier comprises a sealing arrangement which is abuttable to a rotatable shaft.

11. A turbo-machine, comprising
    a rotatable shaft being rotatable around a rotary axis, wherein a radial direction is orientated perpendicular to the rotary axis, and
    at least one system for bleeding off a working fluid as set forth in claim 1,
    wherein the vane platform of the vane device surrounds partially the inner volume (Vi) of the turbo-machine, wherein inside the inner volume (Vi) the working fluid is flowable, and
    wherein the at least one vane element extends from the vane platform into the inner volume (Vi) such that the working fluid is flowable along the vane element.

12. The turbo-machine according to claim 11,
    wherein the at least one inlet hole is formed into the annular rail such that the inlet hole extends along the radial direction.

13. The turbo-machine according to claim 11, wherein the at least one inlet hole is formed in the annular rail to have a radial direction inclined to coincide with a swirl direction of the working fluid at the annular gap.

14. A method for bleeding off a working fluid from an inner volume (Vi) of a turbo-machine, comprising
    providing a system having a vane carrier comprising an annular rail, a vane device comprising at least one vane element, at least one vane platform and a vane root,
    mounting the vane element to the vane platform,
    mounting the vane root to the annular rail,
    forming a first annular cavity between a radially outer surface of the vane platform and the annular rail,
    forming an annular gap between an edge of the vane platform and the vane carrier such that a part of the working fluid of the turbo-machine is bleedable through the annular gap into the first annular cavity, forming a second annular cavity between the vane root, the annular rail and the vane carrier radially outward of the vane root along a radial axis of the vane element; and forming at least one inlet hole into the annular rail without need for forming a further hole or other weakening provision in the vane device for coupling the first annular cavity and the second annular cavity.

* * * * *